(12) United States Patent
Kirsten et al.

(10) Patent No.: US 10,843,311 B2
(45) Date of Patent: Nov. 24, 2020

(54) GRIPPING OR CLAMPING DEVICE

(71) Applicant: SCHUNK GMBH & CO. KG SPANN-UND GREIFTECHNIK, Lauffen am Neckar (DE)

(72) Inventors: Benjamin Kirsten, Brackenheim (DE); Samuel Wuetherich, Pfaffenhofen (DE)

(73) Assignee: SCHUNK GMBH & CO. KG SPANN-UND GREIFTECHNIK, Lauffen am Neckar (DE)

( * ) Notice: Subject to any disclaimer, the term of this patent is extended or adjusted under 35 U.S.C. 154(b) by 262 days.

(21) Appl. No.: 15/762,000

(22) PCT Filed: Aug. 24, 2016

(86) PCT No.: PCT/EP2016/070017
§ 371 (c)(1),
(2) Date: Mar. 21, 2018

(87) PCT Pub. No.: WO2017/050514
PCT Pub. Date: Mar. 30, 2017

(65) Prior Publication Data
US 2018/0290267 A1    Oct. 11, 2018

(30) Foreign Application Priority Data

Sep. 22, 2015    (DE) .................. 10 2015 218 127

(51) Int. Cl.
*B25B 5/10*    (2006.01)
*B23B 31/177*    (2006.01)
(Continued)

(52) U.S. Cl.
CPC ........ *B25B 5/101* (2013.01); *B23B 31/16254* (2013.01); *B25B 5/02* (2013.01); *B25J 15/028* (2013.01)

(58) Field of Classification Search
CPC ..... B25B 5/02; B25B 5/101; B23B 31/16254; B25J 15/028
(Continued)

(56) References Cited

U.S. PATENT DOCUMENTS

| 6,827,381 | B1* | 12/2004 | Reichert | ............... B25J 15/028 |
| | | | | 294/119.1 |
| 6,830,273 | B2* | 12/2004 | Michler | ............ B23B 31/16237 |
| | | | | 269/234 |
| 8,152,214 | B2* | 4/2012 | Williams | .............. F16C 29/126 |
| | | | | 294/119.1 |

FOREIGN PATENT DOCUMENTS

| DE | 3736148 A1 | 5/1989 |
| DE | 10049070 A1 | 5/2002 |

(Continued)

OTHER PUBLICATIONS

International Search Report and Written Opinion Form PCT/ISA/210 and PCT/ISA/237, International Application No. PCT/EP2016/070017 pp. 1-10, International Filing Date Aug. 27, 2016, search report dated Dec. 13, 2016.

(Continued)

*Primary Examiner* — Monica S Carter
*Assistant Examiner* — Alberto Saenz
(74) *Attorney, Agent, or Firm* — Bond Schoeneck & King, PLLC; George McGuire

(57) ABSTRACT

The invention relates to an automation component or clamping device including a basic housing, at least one jaw movably guided in a jaw guide of the basic housing, and a piston movably guided in the basic housing, wherein the piston has a piston surface, wherein the piston is coupled in terms of movement to the jaw, and wherein a piston rod extending on the piston transversely with respect to the (Continued)

piston surface, wherein the centroid of the piston surface is spaced apart from the central longitudinal axis of the piston rod (22).

12 Claims, 4 Drawing Sheets

(51) Int. Cl.
  *B25J 15/02* (2006.01)
  *B25B 5/02* (2006.01)
(58) Field of Classification Search
  USPC .......................................... 269/249
  See application file for complete search history.

(56) References Cited

FOREIGN PATENT DOCUMENTS

| | | | |
|---|---|---|---|
| DE | 202011103200 | U1 | 7/2012 |
| JP | 2009125851 | A | 6/2009 |
| JP | 2003526528 | A | 9/2009 |
| WO | 0168328 | A1 | 9/2001 |

OTHER PUBLICATIONS

Translated Japanese Office Action for JP2018534002. Office Action dated Aug. 27, 2019, pp. 1-3.

\* cited by examiner

GRIPPING OR CLAMPING DEVICE

CROSS-REFERENCE TO RELATED APPLICATIONS

This application is the United States National Phase Entry of PCT Application No. PCT/EP2016/070017 filed Aug. 24, 2016, which claims priority to German Application No. 10-2015-218127.8 (DE), filed Sep. 22, 2015, the entire disclosure of each of which is incorporated herein by reference.

BACKGROUND

The invention relates to a gripping or clamping device having a main housing, having at least one main jaw that is extendable and retractable in a clamping direction in the main housing, having a wedge hook that is drivable transversely to the clamping direction along a guide axis, the wedge hook having at least one hook and a web, located between the hook and the guide axis, with a web portion, the hook having guide surfaces that extend obliquely with respect to the clamping direction and to the guide axis and are arranged parallel to one another, said guide surfaces being coupled in terms of movement to a main-jaw-side guide groove that extends parallel thereto, such that a movement of the wedge hook along the guide axis results in a movement of the main jaw in the clamping direction. The invention also relates to an associated wedge hook.

The clamping devices may for example be chucks, in particular of a lathe or vices. The gripping or clamping devices may in particular be parallel or centric grippers. Accordingly, the main jaws may be gripper jaws or clamping jaws.

A wide range of clamping or gripping devices of this kind are known from the prior art.

For example, EP 1 263 554 B1 discloses a parallel gripper having a housing and two adjustable main jaws that are movably mounted, in a jaw guide, in a housing. In this case, the main jaws can be adjusted by means of a wedge-hook transmission.

In this case, it has been found to be necessary for the structure of clamping or gripping devices of this kind to be as compact as possible.

It is also necessary to reduce the surface pressure between the wedge hooks and main jaws without increasing the installation space required.

SUMMARY OF THE INVENTION

The object of the invention is accordingly that of developing clamping or gripping devices of the type mentioned at the outset so as to achieve, as simply as possible, a reduction in the installation space or a reduction in the surface pressure between the wedge hooks and main jaws while the installation space remains constant.

This object is achieved by means of a clamping or gripping device having a hook that has a vertical extent in the guide-axis direction that is greater than the vertical extent of the web portion, such that the hook forms an extension portion that extends in the guide-axis direction.

The advantage of the clamping or gripping device according to the invention is that a reduced overall height of the gripping or clamping device can be achieved while the piston stroke and the overlap between the wedge hook and the main jaw remain constant. The travel path of the main jaw nevertheless remains constant. Equally, it is possible to reduce the surface pressure between the main jaw and the wedge hook while the overall height remains constant.

It is therefore conceivable to reduce the height of the installation space of the gripping or clamping device in the following manner: The overall vertical extent of the wedge hook can be reduced, by a specified amount, compared with the wedge hook known from EP 1 263 554 B1. As a result, the guide surfaces are reduced by a specified amount. However, the guide surfaces can be extended downwards by said specified amount by means of the extension portion being formed on the wedge hook. Equally, it is also conceivable to keep the height of the installation space, and, by association, the overall vertical extent of the wedge hook, constant and instead to use the extension portion in order to reduce the surface pressure between the guide groove and the wedge hook by means of increasing the guide surfaces. It is thus possible to provide a large contact surface between the main jaw and the wedge hook, as a result of which the surface pressure can be reduced.

In this case, it is conceivable for just one of the guide surfaces to be directly engaged with the main-jaw-side guide groove, by means of touching, in one movement direction, while another guide surface is directly engaged with the main jaw, by means of touching, in the opposite movement direction. Equally, it is also conceivable for all the guide surfaces to constantly touch the guide groove.

The wedge hook advantageously comprises an adjustment portion that extends along or around the guide axis. In particular, it is furthermore possible, in this case, for the adjustment portion to protrude beyond the extension portion in the guide-axis direction. The adjustment portion can furthermore be connected in particular to a piston that is movably arranged in a cylinder chamber, such that the wedge hook can provide a hydraulic or pneumatic adjustment device for moving the main jaws.

The outer contours of the mutually parallel guide surfaces are particularly advantageously congruent when viewed in the clamping direction or perpendicularly to the plane of the guide surfaces. It is thus possible to provide particularly advantageous transmission of forces from the wedge hook to the main jaw. In particular, the hook can be cylindrical or designed as a parallelepiped in this case. The wedge hook can thus be produced in a particularly simple manner.

In particular, the web portion can comprise a lower face that extends perpendicularly with respect to the guide axis, in a plane $E_2$. Furthermore, the guide surfaces can each form a lower edge together with a lower face of the hook that extends perpendicularly with respect to the guide axis, it being possible for the lower edges to be located in a plane $E_3$, and the plane $E_3$ being spaced apart from the plane $E_2$. A downwardly extending extension portion is thus formed on the hook.

In this connection, it is also conceivable for the guide surface to in each case form an upper edge together with an upper face of the hook that extends perpendicularly with respect to the guide axis, the upper edges being located in a plane $E_1$ extending perpendicularly with respect to the guide axis. In this case, it is in addition also possible for the web portion or the web to also comprise an upper face $E_1$ extending perpendicularly with respect to the guide axis, in the plane $E_1$. The extension portion thus extends exclusively downwards.

The ratio of the spacing of the plane $E_2$ from the plane $E_3$ to the spacing of the plane $E_1$ and the plane $E_3$ can advantageously be in the range of from 0.15 to 0.35 and in particular in the region of 0.25.

The spacing of the plane $E_2$ from the plane $E_3$ is preferably in the range of from 1 mm to 4 mm and in particular in the range of from 1.5 mm to 3.0 mm.

A recess for receiving the extension portion when the main jaw is extended or retracted is preferably arranged in the main housing, in the region facing the extension portion. Depending on the orientation of the guide surfaces, the main jaw is either extended or retracted in this end position. In this case, the extension portion dips into the recess at least in portions, preferably completely. As a result, the wedge hook can arrive at the same end position (main jaw in the extended or retracted position, depending on the orientation of the guide grooves) as is conventional in known clamping or gripping devices in which there is no extension portion.

In the extended or retracted position, again depending on the orientation of the wedge hooks, the upper face of the hook or of the wedge hook can be in a plane, extending perpendicularly with respect to the guide axis, together with the upper face of the main-jaw-side engagement portion that defines the guide groove. A continuous plane can thus be formed, and the wedge hook does not protrude beyond the main housing.

The hook and/or the main-jaw-side engagement portion that defines the guide groove can further comprise rounded regions in order to reduce the notch effect in the inside and/or outside edges. In particular, all the edges of the guide grooves may be rounded.

According to a particularly advantageous embodiment of the invention, the web is integrally formed on the hook in the region of the inner guide surface facing the guide axis. In this case, the inner guide surface facing the guide axis corresponds to the radially inner guide surface with respect to the guide axis, while the outer guide surface remote from the guide axis corresponds to the radially outer guide surface with respect to the guide axis.

The inner guide surface thus comprises two free guide surface portions that are mutually spaced and mutually mirror-symmetrical. If the upper faces of the web and of the hook are in the same plane, the outer contour of the inner guide surface can thus be interrupted by the web or formed thereby.

The adjustment portion advantageously comprises an outer lateral surface. In this case, the adjustment portion can in particular be circular-cylindrical. Furthermore, the lateral surface can in particular be designed as a sealing and/or guide surface, it being possible for the lateral surface to in particular cooperate with a complementary main-housing-side surface. In this case, it is possible in particular for the extension portion to protrude, in the guide-axis direction, beyond the free end of the lateral surface facing the web. It is also conceivable, however, for the free end of the lateral surface facing the web to protrude beyond the extension portion in the guide-axis direction.

According to a particularly advantageous embodiment of the invention, the gripping or clamping device is designed as a parallel gripper or parallel clamp. In this case, two main jaws are provided that can be moved towards one another and away from one another in the clamping directions. It may furthermore be provided for the wedge hook to comprise two hooks and one web located between the relevant hook and the guide axis in each case, one hook cooperating with one main jaw in each case. It is therefore possible to actuate both main jaws using just one wedge hook. According to a further embodiment of the invention, the gripping or clamping device is designed as a centric gripper or centric clamp, it being possible in particular for the wedge hook to comprise three hooks and one web located between the relevant hook and the guide axis in each case, one hook cooperating with one main jaw in each case.

In this case, the wedge hook can in particular be integral. Equally, it is conceivable for the hook and the web to be integral, while the adjustment portion can be a separate component. In this case, the adjustment portion can be screwed to the web. It is furthermore conceivable for the piston to be separate from the adjustment portion, it being conceivable in particular for the web, the adjustment portion and the piston to be interconnected by means of a single screw connection.

The invention is also solved by a wedge hook for a gripping or clamping device for a clamping or gripping device according to the invention. A wedge hook of this kind therefore in particular comprises an extension portion.

Further details and advantageous embodiments of the invention can be found in the following description, on the basis of which embodiments of the invention will be described and explained in greater detail.

BRIEF DESCRIPTION OF THE DRAWINGS

FIG. 1 is a cross section through a multipart wedge hook;

DETAILED DESCRIPTION

Figure 1:
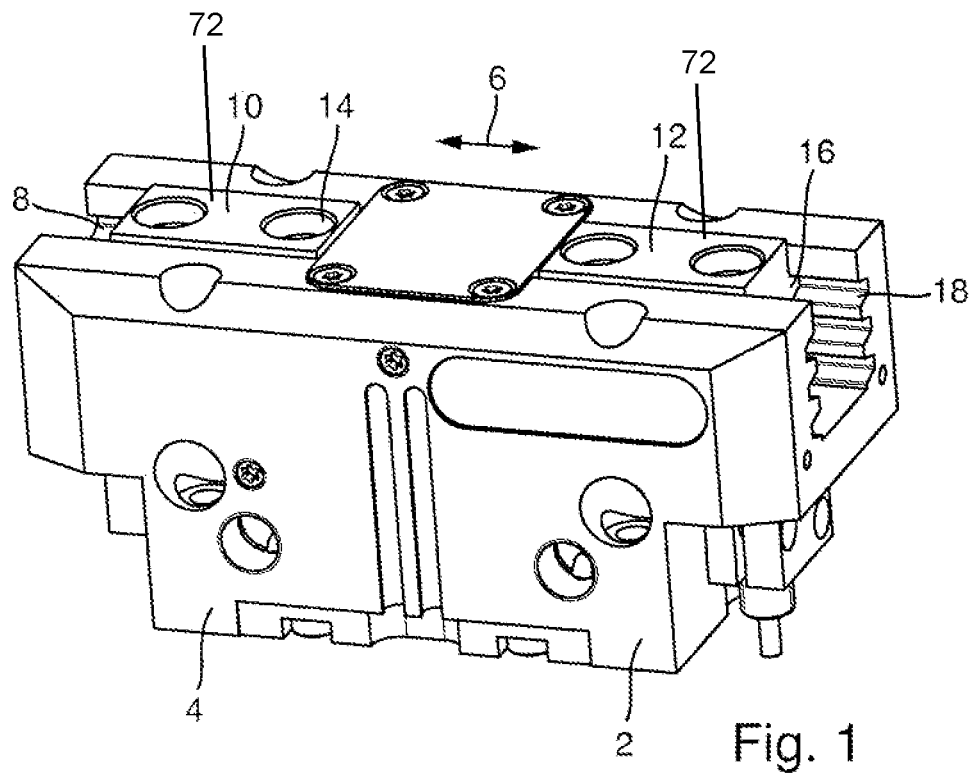
FIG. 1 is a perspective view of a parallel gripper.

FIG. 1 shows a gripping device 2 designed as a parallel gripper. Said device comprises a main housing 4 having a jaw guide 8, extending in the clamping direction 6, for gripper jaws 10, 12 which can be inserted into the jaw guide 8 in the clamping direction 6 and are mounted therein so as to be extendable and retractable. In this case, the clamping direction 6 also corresponds to the longitudinal direction 6. Mounting openings 14 for releasably attaching gripper finger elements in the broadest sense of the term are provided on the upper faces 72 of the gripper jaws 10, 12 and will not be described in greater detail here. As can further be seen in FIG. 1, the gripper jaws 10, 12 each comprise guide webs 16 on either side, which webs extend in the movement direction, are wedge-shaped or trapezoidal having a flattened free end, and engage in main-housing-side guide grooves 18. Main jaws 10, 12 further comprise side portions 70, as seen in FIG. 2.

A wedge-hook transmission is provided for adjusting the gripper jaws 10, 12. The wedge hook 22 is drivable transversely to the clamping direction 6 along a guide axis 20 which can be seen clearly in FIGS. 2 and 3.

Figure 4:
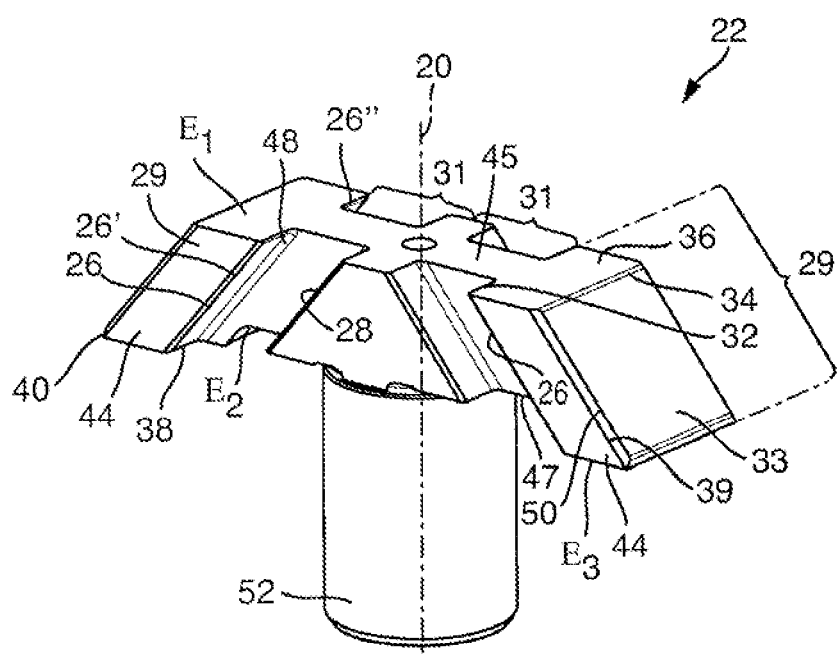
FIG. 4 is a perspective view of the wedge hook of the parallel gripper shown in FIGS. 1 to 3.
Figure 5:
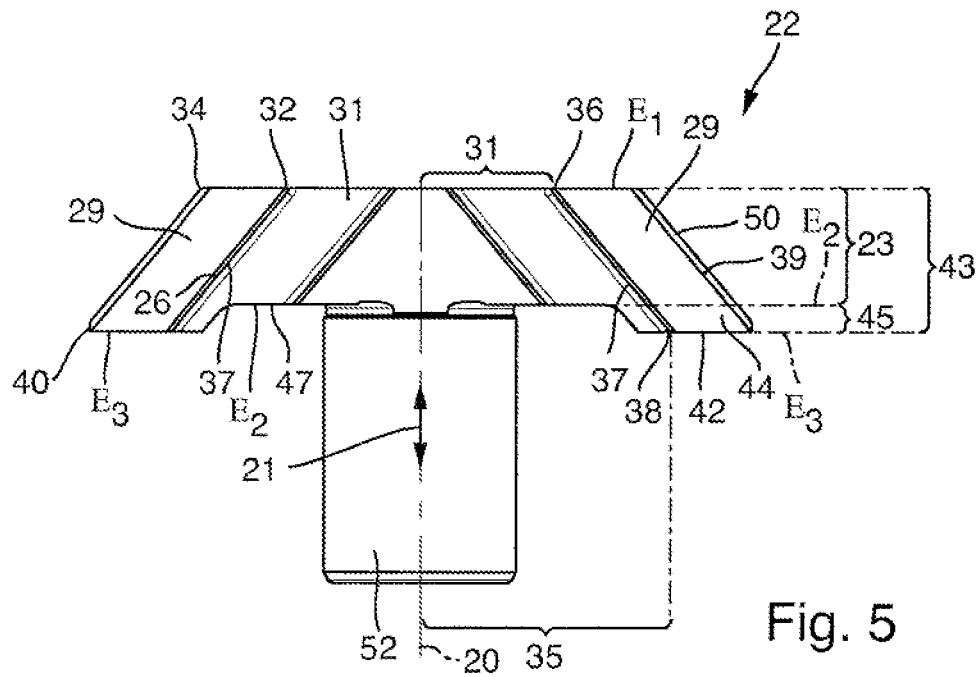
FIG. 5 is a side view of the wedge hook according to FIG. 4.
Figure 6:
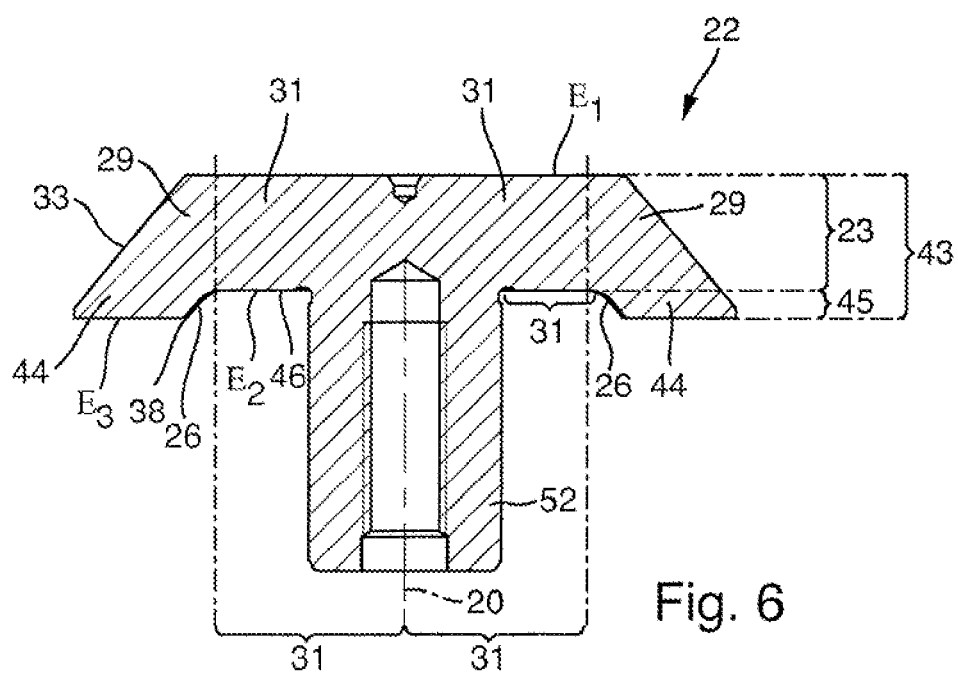
FIG. 6 is a cross section through the wedge hook according to FIG. 4.

As shown in FIGS. 4 to 6, the wedge hook 22 comprises two mutually mirror-symmetrical hooks 29, and webs 35 that are positioned between the hooks 29, in the guide axis 20, and that each comprise a web portion 31. The hooks 29 further each comprise two guide surfaces 26, 33 that extend obliquely with respect to the clamping direction 6 and to the guide axis 20 and are arranged parallel to one another. In this case, the webs 35 extend from the guide axis 20 as far as the hook 29.

Figure 2:
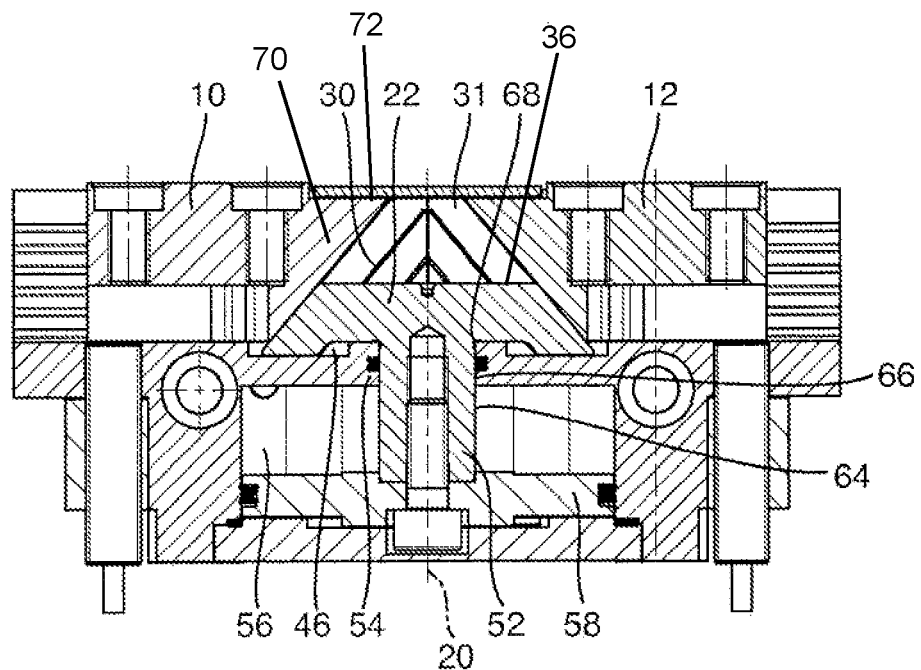
FIG. 2 is a cross section through the parallel gripper according to FIG. 1 when the jaws are retracted.
Figure 3:
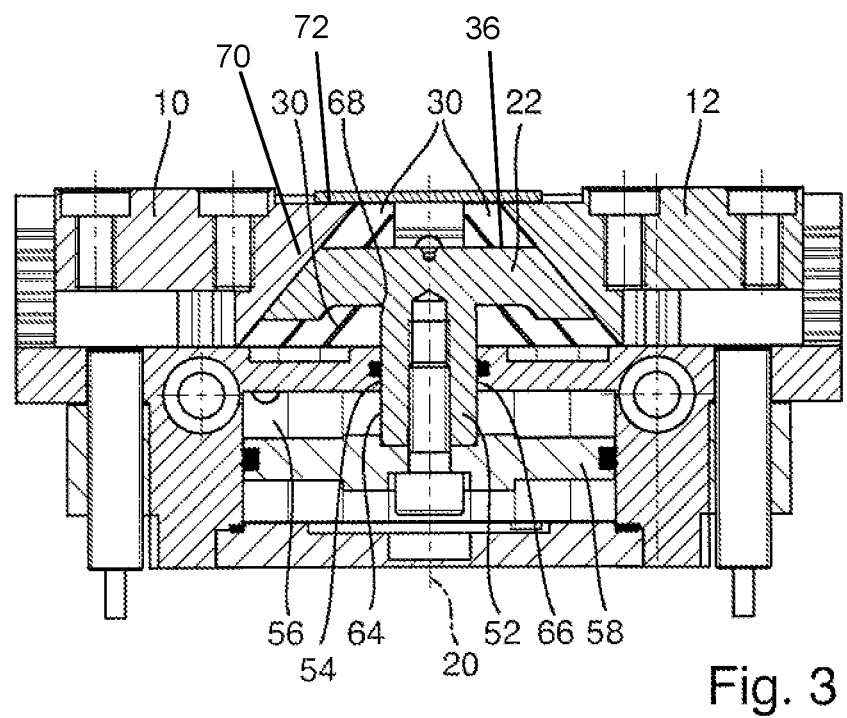
FIG. 3 is a cross section through the parallel gripper according to FIG. 1 when the jaws are extended in part.

As is clear from FIGS. 2 and 3, the guide surfaces 26, 33 are coupled in terms of movement to a main-jaw-side guide groove 30 that extends parallel thereto, such that a movement of the wedge hook 22 along the guide axis 20 results in a movement of the main jaw 10, 12 in the clamping direction 6.

In this case, as is clear from FIGS. 5 and 6, the hooks 29 or the guide surfaces 26, 33 have a vertical extent 43 in the guide-axis direction 21 that is greater than the vertical extent 23 of the web portions 31, such that the hooks 29 each form an extension portion 44 that extends in the guide-axis direction 21 and has a vertical extent 45. The vertical extent 43 of the hooks 29 is therefore made up of the vertical extents 23, 45 of the relevant web portion 31 and of the relevant extension portion 44. The wedge hook 22 further comprises an adjustment portion 52 that extends cylindrically around the guide axis 20, the adjustment portion 52 protruding beyond the extension portion 44 in the guide-axis direction 21.

As can be seen in FIGS. 2 and 3, the adjustment portion 52 passes through an opening 54 in the base of the jaw guide 8 and engages in a cylinder chamber 56 of the main housing 2 arranged therebelow. A piston 58 is arranged at the lower end of the adjustment portion 52, the piston 58 being movably mounted in the cylinder chamber 56 such that the cylinder chamber 56 forms, together with the piston 58, a hydraulic or pneumatic adjustment device for the wedge hook 22. In this case, the adjustment portion 52 comprises an outer lateral surface 64 that is designed as a guide and sealing surface and cooperates with the housing-side surface 66 that is complementary thereto and that defines the opening 54. In this case, the extension portion 44 protrudes, in the guide-axis direction, beyond the free end 68 of the lateral surface 64 facing the web 35.

As is clear in particular from FIG. 4, the outer contours of the mutually parallel guide surfaces 26, 33 are congruent, viewed both in the clamping direction 6 and perpendicularly to the plane of the guide surfaces 26, 33. In this case, the web 35 is integrally formed on the hook 29 in the region of the other guide surface 26 facing the guide axis 20, such that the inner guide surface 2 comprises mutually spaced and mutually mirror-symmetrical guide surface portions 26' and 26". The outer contour of the inner guide surface 26 is therefore interrupted in the region in which the web 35 is integrally formed on the hook 29. Nonetheless, the outer contour of the guide surface 26 is the same as that of the outer guide surface 33.

In this case, the hook 29 is cylindrical and designed as a parallelepiped.

As can further be seen in FIGS. 4 to 6, the web portion 31 comprises a lower face 47 that extends perpendicularly with respect to the guide axis 20 in a plane E2, the guide surfaces 26, 33 each a lower edge 38, 40 together with a lower face 42 of the hook 29 that extends perpendicularly with respect to the guide axis 20, in a plane E2, and the lower edges 38, 40 being in a plane E3. In this case, the plane E3 is spaced apart from the plane E2 by a vertical extent 45. Furthermore, the guide surfaces 26, 33 form an upper edge 32, 34 together with an upper face 36 of the hook 29 that extends perpendicularly with respect to the guide axis 20. The upper edges 32, 34 are in a common plane E1 that extends perpendicularly with respect to the guide axis. The web portion 31 also comprises an upper face 45 which extends in the plane E1. In this case, the plane E1 is spaced apart from the plane E2 by a spacing or the vertical extent 23. Furthermore, the plane E3 is spaced apart from the plane E1 by the vertical extent 43 which is greater than the spacing or the vertical extent 23 between the plane E2 and the plane E1. The hook 29 thus comprises a downwardly extending extension portion 44.

In this case, the ratio V of the spacing of the plane $E_2$ from the plane $E_3$ to the spacing of the plane $E_1$ from the plane $E_3$ is in the region of 0.15, 0.25 and in particular 0.2.

As can further be seen in FIGS. 2 and 3, in the region facing the extension portion 44, the main housing 2 comprises two recesses 46 for receiving the relevant extension portion 44 when the main jaws 10, 12 are retracted. The recesses 46 can in particular each be cylindrical and have a rectangular or square base.

In order to reduce the notch effect, all the edges 48, 50 of the hook 29 are rounded, such that rounded regions 37, 39 are formed.

Figure 7:
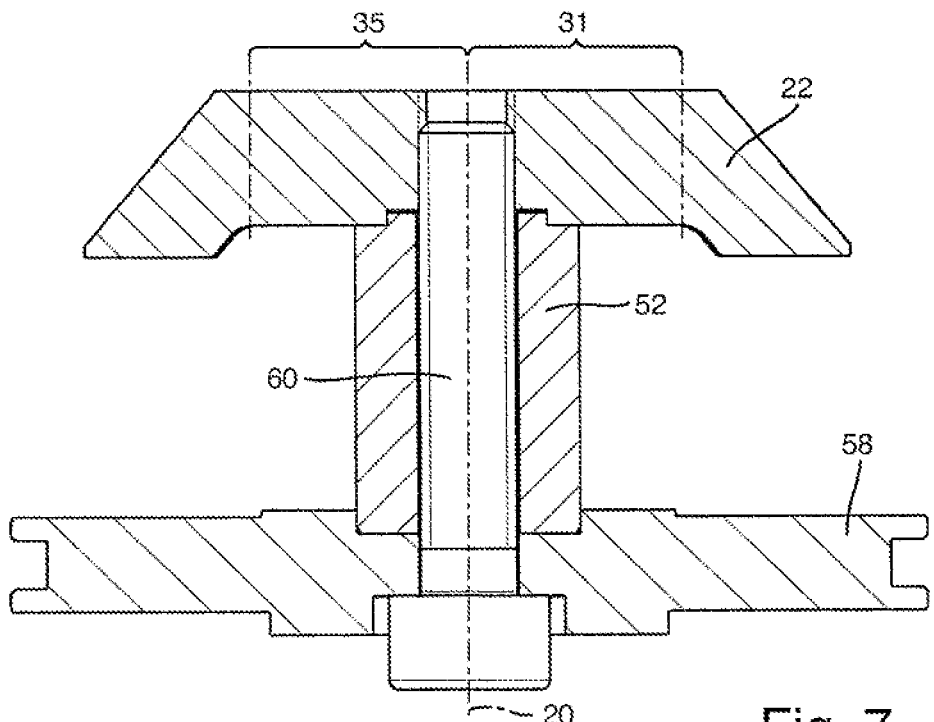

According to FIG. 7, the hook 29 is integral with the web 35. The adjustment portion 52 and the piston 58, which are each formed as separate components, are fastened to the web 35 by means of a screw connection 60.

Figure 8:
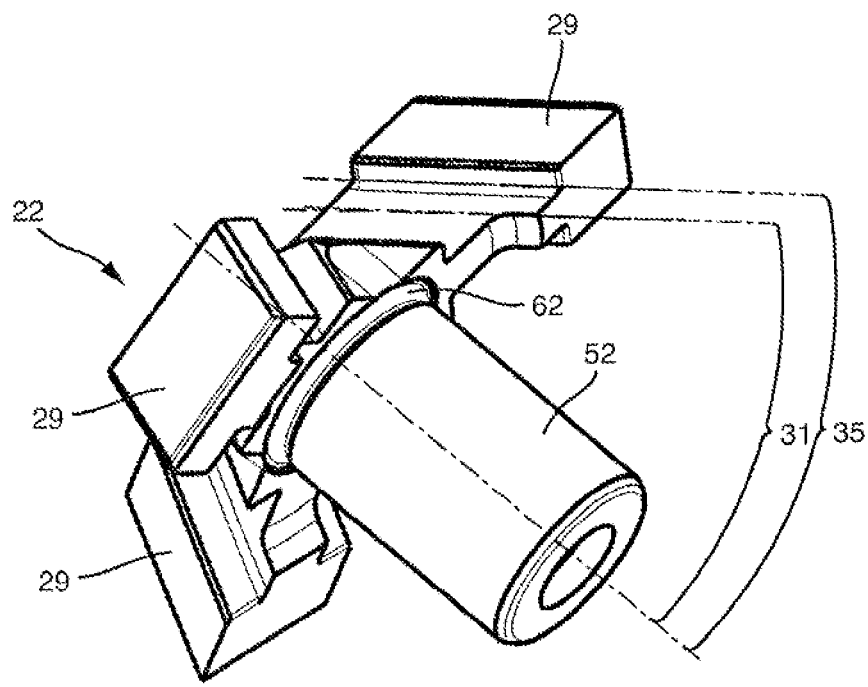
FIG. 8 is a perspective view of a wedge hook for a centric gripper.

FIG. 8 shows a wedge hook 22 for a centric gripper. In this case, the wedge hook 22 comprises three hooks 29 and one web 35 located between the relevant hook 29 and the guide axis in each case, one hook 29 cooperating with one main jaw in each case. A relief groove 62 is provided at the free end 68 of the lateral surface 64, which relief groove reduces the notch effect.

The overall height of the gripping device 2 can thus be reduced without losses in the travel path of the main jaws 10, 12, by the overall vertical extent of the wedge hook 22 being reduced by a specified amount and the extension portion 44 being formed, said portion having a vertical extent of exactly said amount. Equally, the surface pressure can be reduced while the installation space remains constant, by the extension portion 44 being formed without reducing the overall vertical extent of the wedge hook 22. As a result, the contact surface between the guide surfaces 26, 33 can be enlarged, resulting in an advantageous reduction in the surface pressure.

What is claimed is:

1. Gripping or clamping device having a main housing, having at least one main jaw that is extendable and retractable in a clamping direction in the main housing, having a wedge hook that is drivable transversely to the clamping direction along a guide axis, the wedge hook having at least one hook and a web, located between the hook and the guide axis, with a web portion having a vertical extent, the hook having guide surfaces, including an inner guide surface, that extend obliquely with respect to the clamping direction and to the guide axis and are arranged parallel to one another, said guide surfaces being coupled in terms of movement to a main-jaw-side guide groove that extends parallel thereto, such that a movement of the wedge hook along the guide axis results in a movement of the main jaw in the clamping direction, the hook has a vertical extent along the guide-axis that is greater than the vertical extent of the web portion, such that the hook forms an extension portion that extends along the guide-axis, the outer contours of the guide surfaces extending parallel to one another are congruent in the clamping direction or when viewed perpendicularly to the plane of the guide surfaces, the hook is designed cylindrical or parallelepiped, the guide surfaces each form an upper edge together with an upper face of the hook that extends perpendicularly with respect to the guide axis, the upper edges and the upper face of the hook being in a plane $E_1$ that extends perpendicularly with respect to the guide axis, and the web portion has an upper face that extends perpendicularly with respect to the guide axis, in the plane $E_1$.

2. Gripping or clamping device according to claim 1, wherein the wedge hook comprises an adjustment portion that extends along or around the guide axis, the adjustment portion protruding beyond the extension portion along the guide-axis.

3. Gripping or clamping device according to claim 1, wherein the web portion comprises a lower face that extends perpendicularly with respect to the guide axis, in a plane $E_2$, in that the guide surfaces each form a lower edge together with a lower face of the hook that extends perpendicularly with respect to the guide axis, the lower edges being in a plane $E_3$, and the plane $E_3$ being spaced apart from the plane $E_2$ such that the extension portion extends downwards.

4. Gripping or clamping device according to claim 3, wherein there is spacing between plane $E_2$ and $E_3$ and spacing between plane $E_1$ and $E_3$, wherein a ratio V of the spacing of the plane $E_2$ from the plane $E_3$ to the spacing of the plane $E_1$ from the plane $E_3$ is in a range from 0.15 to 0.35, and in that the spacing of the plane $E_2$ from the plane $E_3$ is in a range of from 1 mm to 4 mm.

5. Gripping or clamping device according to claim 1, wherein, in a region facing the extension portion, the main housing comprises a recess for receiving the extension portion when the main jaws are moved.

6. Gripping or clamping device according to claim 1, wherein the hook comprises an upper face and the main-jaw side portion comprises an upper face, wherein, in the extended or retracted position of the main jaw, the upper face of the hook and the upper face of a main-jaw-side portion that defines the guide groove are in a plane extending perpendicularly with respect to the guide axis.

7. Gripping or clamping device according to claim 1, wherein at least one of the hook and the main-jaw-side portion that defines the guide groove comprise rounded regions.

8. Gripping or clamping device according to claim 1, wherein the web portion is integrally formed on the hook in a region of the inner guide surface facing the guide axis, such that the inner guide surface comprises two mutually spaced and mutually mirror-symmetrical guide surface portions.

9. Gripping or clamping device according to claim 2, wherein the adjustment portion comprises an outer lateral surface having a free end, the outer lateral surface being designed as at least one of a sealing surface and guide surface, and the extension portion protruding, in along the guide-axis direction, beyond the free end of the outer lateral surface facing the web.

10. Gripping or clamping device according to claim 2, wherein the adjustment portion comprises an outer lateral surface having a free end, the outer lateral surface being designed as a sealing and/or guide surface, and the extension portion protruding, along the guide-axis, beyond the free end of the outer lateral surface facing the web.

11. Gripping or clamping device according to claim 1, wherein at least two main jaws are provided that can be moved towards one another and away from one another in the clamping direction, and in that the wedge hook comprises at least two hooks and one web portion located between one of the at least two hooks and the guide axis in each case, one hook cooperating with one main jaw in each case.

12. Wedge hook for a gripping or clamping device and that is drivable transversely to a clamping direction along a guide axis, the wedge hook comprising at least one hook and a web, located between the hook and the guide axis, with a web portion, the hook having guide surfaces that extend obliquely with respect to the clamping direction and to the guide axis and are arranged parallel to one another, said guide surfaces being coupled in terms of movement to a main-jaw-side guide groove that extends parallel thereto, such that a movement of the wedge hook along the guide axis results in a movement of a main jaw in the clamping direction, the hook having a vertical extent along the guide-axis that is greater than a vertical extent of the web portion, such that the hook forms an extension portion that extends along the guide-axis, the guide surfaces being congruent in the clamping direction, and the hook being cylindrical or being designed as a parallelepiped, characterized in that the guide surfaces each form an upper edge together with an upper face of the hook that extends perpendicularly with respect to the guide axis, the upper edges and the upper face of the hook being in a plane $E_1$ that extends perpendicularly with respect to the guide axis, and the web portion has an upper face that extends perpendicularly with respect to the guide axis, in the plane $E_1$.

* * * * *